Sept. 4, 1945.  S. R. BOYER  2,384,071
INSTRUMENT FOR LOCATING AND SPACING BORED HOLES
Filed Nov. 23, 1943  3 Sheets-Sheet 1
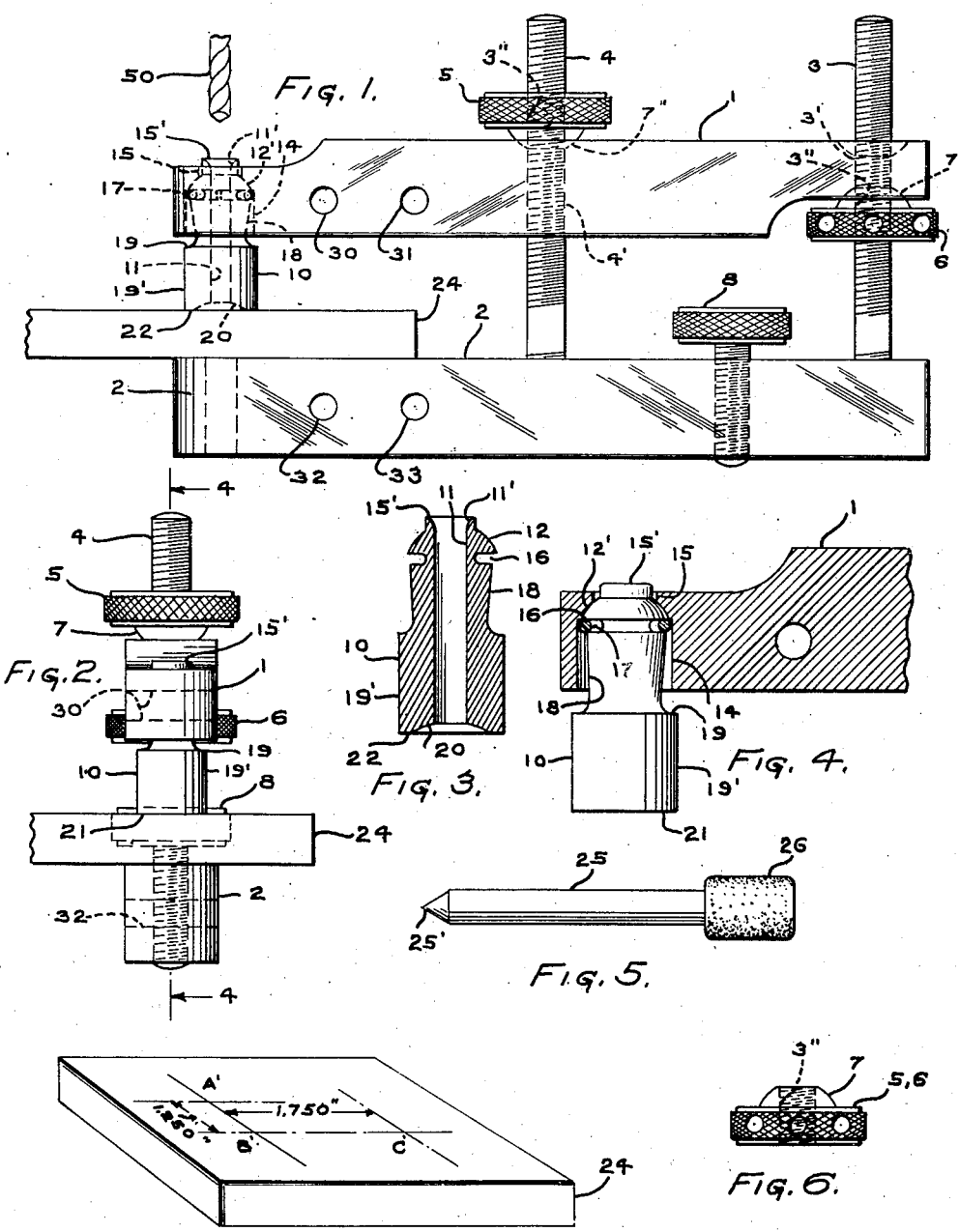
Inventor
SAMUEL R. BOYER Sept. 4, 1945.  S. R. BOYER  2,384,071
INSTRUMENT FOR LOCATING AND SPACING BORED HOLES
Filed Nov. 23, 1943  3 Sheets-Sheet 2
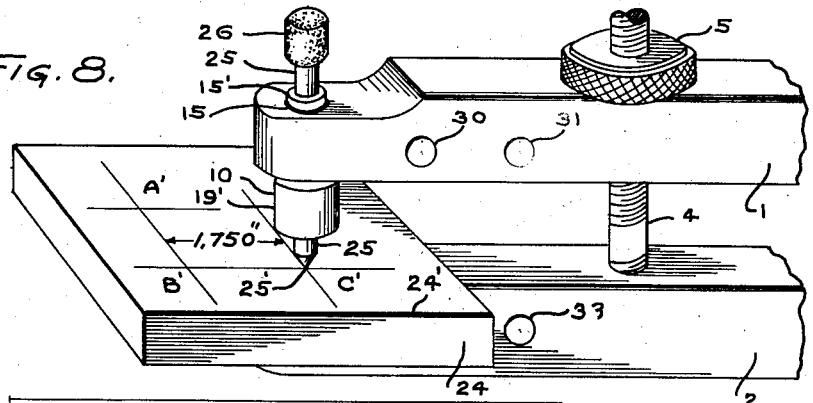
Fig. 8.
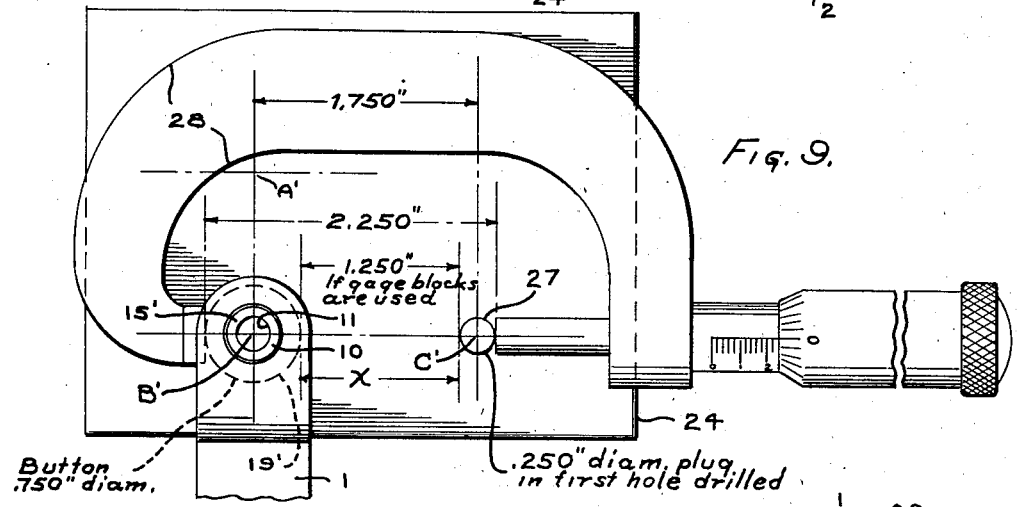
Fig. 9.
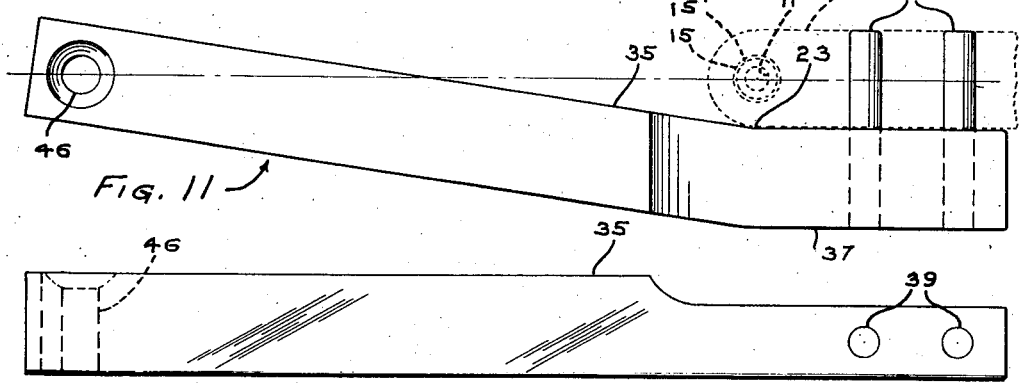
Fig. 11.
Fig. 10.
Inventor
SAMUEL R. BOYER.
By
Attorney Sept. 4, 1945.   S. R. BOYER   2,384,071
INSTRUMENT FOR LOCATING AND SPACING BORED HOLES
Filed Nov. 23, 1943   3 Sheets-Sheet 3

Inventor
SAMUEL R. BOYER
Witness
By Edwin F. Samuels
Attorney

Patented Sept. 4, 1945

2,384,071

UNITED STATES PATENT OFFICE 2,384,071

INSTRUMENT FOR LOCATING AND SPACING BORED HOLES

Samuel R. Boyer, Westminster, Md.

Application November 23, 1943, Serial No. 511,428

3 Claims. (Cl. 77—62)

The invention relates to an instrument for use in precision operations including die or jig construction.

In the existing practice, even when the centers of two holes are laid on a metal surface and duly center punched, and drilled with the greatest of care by means of a drill press all in good order, it will be found, after drilling, that the holes are larger than the drill used, and there will be an almost unavoidable error of appreciable extent as to location and center to center spacing depending on the size of the drill and the degree of accuracy with which the drill point was ground, further the axis of the hole will not be exactly square. However, this is the practice most generally followed by machinists.

Machines known as jig borers are obtainable, but are expensive, and in their use the highest grade of machinists are required. The plate or die to be bored is clamped to the work table and carefully squared, indicated and measured, a very slow, tedious and expensive operation.

In the absence of a jig borer, a lathe or milling machine may be used. The plate, jig or die required to be exactly bored is first laid out with lines on the surface showing the centers of the holes required. Small holes are drilled and tapped in said centers and small precision ground steel cylinders, known as buttons, are secured by screws in said tapped holes, and their exact location further determined by measuring with a height gauge or micrometer, the button being slightly hammered in different directions as required, and remeasured until finally by measuring between or over the buttons, the exact correct position is established and the buttons are then tightened by aforesaid screws.

The plate or jig or die thus buttoned is carefully clamped to the lathe face plate, and adjusted until one button by means of a precision indicator is found to revolve with its axis in exact coincidence with the axis of the rotating head or face plate. The button is then removed and drilling and boring the hole to the correct size is the final step in the production of one hole exactly located. The plate jig or die is then shifted to bring the next button in the exact center and the process is repeated.

Notwithstanding the elaborate and painstaking method described, the holes thus produced may be from .0005 inch to .002 inch center-to-center error and their axes not exactly square with the buttoned surface, and the time required is five or ten times as great as with the improved device of the invention.

The object of the invention is to overcome the above suggested and other difficulties and deficiencies of the prior methods and practice and to provide a device whereby two or more holes of the same size can be drilled to an exact predetermined center-to-center spacing, and exactly square or, in other words, at right-angles or normal to the surface of the material to be drilled and, or, a single hole can be precisely located and bored exactly square and of exact size.

It is also of importance that the device of the invention can be produced at relatively small cost, and can be used with satisfactory results by a workman of ordinary skill operating with reasonable care, and further the operation performed with the improved device is simple and quick, the saving of time effected in addition to the increased precision being of great importance.

While the device as described enables the mechanic to accurately drill but one size hole as above outlined, or a series of holes in precise relation each to the other, the system includes, when required, a follow-up of the holes thus drilled by enlarging them with counter-bores and reamers, and whereby the holes thus bored are made ready to receive the pins, shafts, or bushings for which the holes were made. Both the device as a whole, and various features and details thereof separately considered are believed to represent important advances in the art, and both are capable of variation within the skill of the average mechanic without departure from the spirit of the invention.

In the accompanying drawings, I have illustrated as an example of the application of the invention, a precision device which is at present regarded as the preferred form and certain optional modifications and/or additions.

In the drawings:

Figure 1 is a side elevation of the device in operative position.

Figure 2 is an end elevation of the same looking from the left in Figure 1.

Figure 3 is a vertical central section on the axis of the precision button.

Figure 4 is a fragmentary section on the line 4—4 in Figure 2.

Figure 5 is an elevation of a centering pin to be used in connection with the button as in Figure 3.

Figure 6 is a detail of the clamping nuts.

Figure 7 is a perspective view of a plate showing the preliminary markings for locating holes to be made in accordance with one method of practicing the invention.

Figure 8 is a similar view showing the initial position of the device in locating a hole according to the markings in Figure 7.

Figure 9 is a diagrammatic view showing the use of a micrometer caliper in connection with the device for locating a second hole spaced a predetermined distance from a hole previously bored.

Figure 10 is an elevation of the upper bar extension.

Figure 11 is a plan view of the same.

Figure 13:
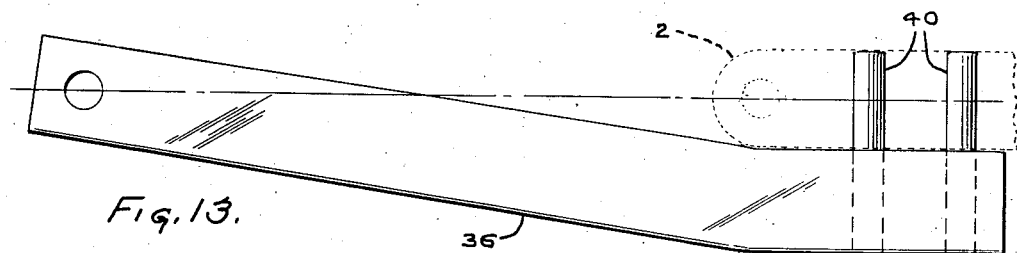
Figure 13 is a plan of the same.
Figure 12:
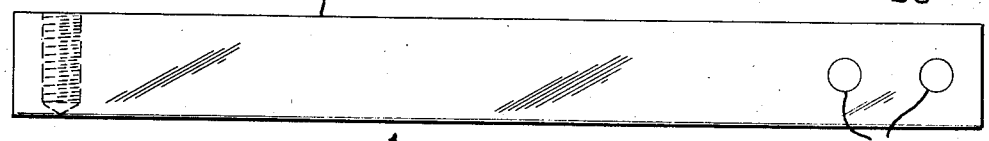
Figure 12 is an elevation of the lower bar extension.

Referring to the drawings by numerals each of which is used to indicate the same or similar parts in the different figures; the device as shown, particularly in Figure 1, consists of upper and lower steel bars 1 and 2 which are substantially parallel and opposite and connected by clamping screws 3 and 4. In the form shown both of these screws are rigidly secured in the lower bar 2 and extend upwardly at right angles thereto through suitable holes in the upper bar 1. These screws are spaced in the direction of the length of the bars, screw 3 being near the right hand ends and screw 4 near the centers of the bars. Nuts 5 and 6 are threaded on to the screws 4 and 3, respectively, nut 5 being threaded downwardly onto the top of the bar 1 near its center and the nut 6 upwardly against the bottom of the bar 1 at its outer or right end. While screws and nuts are shown, other clamping means may be employed.

In the preferred form shown, the upper end of the hole 4' in the bar 1, and the lower end of the hole 3' in said bar are cupped in a section of a sphere and the nuts 5, 6 shown in Figure 6 have a protuberance 7 on one circular face which is shown in the form of a spherical section, concentric with the threaded hole 3'' in the nut. This spherical protuberance fitting in the threaded cups 7' and 7'' just described forms a universal bearing of which any suitable form may be employed.

It is also to be noted that in the form shown a leveling screw 8 is threaded downwardly through the lower bar 2 protruding downwardly therefrom at its lower end between the screws 3 and 4 just described. This screw 8 is for the purpose of slightly tilting the device into level position when it is used on a drill press table and/or with parallels under the work to be drilled.

A feature of the invention which is regarded as of considerable importance is the centering button 10 shown in connection with the device or instrument in Figure 1, but more fully illustrated in detail in Figures 3 and 4. This button or member is elongated and has a central axial hole or bore 11 extending from one end thereof to the other end. This hole is formed with the maximum of precision and is adapted to fit closely upon a drill of the size of the hole which the instrument is adapted to locate, the fit being a close running fit; and the button of extremely hard material as high speed steel or carboloy, the central hole 11 being ground or lapped and exactly sized as aforesaid to fit closely a drill of convenient size. The upper end of the hole 11 is flared or rounded at 11' to permit the drill point to enter easily and surrounding the upper end of the button and concentric with the axis of the hole, there is a circular zone 12 in the form of a convex spherical section upwardly disposed, the outer end of the arm 1 opposite to screw 3 being provided with a hole or socket 14, the axis of which is vertical. This socket has at its upper end a circular concave surface 12' in the form of a concave spherical section or zone concentric with the socket axis and adapted to receive and conform to the surface 12 on the button. The hole or socket 14 also extends upwardly through the top of the bar in the form of a hole of relatively reduced size at 15, being of a size suitable to admit and allow free play of the upper end 15' of the button 10 or of the drill or pin 25 to be described. Below the spherical seating surface 12, the button, as shown, is provided with a peripheral groove 16 in which is seated a spring ring 17 which springs outwardly against the wall of the hole or socket 14 holding the button yieldingly in place when inserted in the manner in which it is shown in Figure 4. The spring ring 17 prevents accidental displacement of the button 10 from its socket or hole 14.

In the preferred form shown, the button 10 which is symmetrical about a vertical axis and circular in cross-section is tapered, that is, of reducing cross-section downwardly from the groove 16 as illustrated at 18 in Figure 4, the hole 14 being preferably cylindrical though it may be oppositely tapered if desired, the purpose being that the button 10 may rock freely on the seat 12' tending to take a position normal to the surface of the work on which it is placed as hereinafter described.

In the form shown, the taper 18 terminates in a circumferential shoulder 19, below which the button is of cylindrical form, concentric with the button axis, being preferably concave at its lower end as shown at 20 in Figure 3, said concavity being concentric with the axis.

The lower end 21 of the button 10 has its peripheral edge surface 22 in a plane at right angles to the axis of the button and when placed on a flat surface or one which is substantially flat, the button being free to oscillate about the center of the spherical bearing 12, 12' in the upper clamp bar 1, tends to take a position as aforesaid with its axis normal to the surface of the work as shown at 24 in Figure 1, reference character 24 indicating a plate in which holes are to be drilled and spaced according to the practice of the invention. The bottom end of the button being concave facilitates this operation, tending to compensate for, or overcome roughness and minor irregularities of the work surface.

Figure 5 illustrates a centering pin 25 in the form of a hard steel, pointed pin of a size to fit neatly in the hole 11 in the button 10. A soft rubber handle 26 is a convenient means for holding the pin in use and it prevents inexperienced or careless operators from using it as a center punch, to be tapped with a hammer which would injure it for the purpose for which it is intended, i. e. accurate centering of the button. The point 25' is ground concentric to the surface of the pin which is cylindrical and is hardened; the use of the pin being further hereinafter explained.

In operation assuming that holes are required in a plate as shown in Figure 7 at the intersections A', B', and C'; the operator first marks the intersection with a prick punch and hammer, according to the usual practice. The centering pin 25 is then placed in the hole 11 in the button 10 with its point 25' extending beyond the bottom plane of the button and engaging the prick point mark at the intersection C", Figure 7 as best shown in Figure 8; it being assumed for convenience that the diameter of the lower cylindrical portion 19' of the button 10 is .750 inch, any convenient diameter being suitable, 19' being a ground measuring surface.

With the thumb of the operator holding the pin 25, i. e. pressing it down against the prick punch mark at C' as in Figure 8, the nut 5 is screwed downwardly lowering arm 1, and bringing the button 10 in contact with plate 24, the parts being clamped in position as shown in Figure 1 by turning the nut 6 upwardly against the bar 1. When the parts are thus clamped with the button 10 concentric with the point C', the pin 25, Figure 8 is removed, leaving the button 10 as aforesaid with the hole 11 centered with the point C' and normal to the top surface 24' of the plate 24. With the instrument clamped to the plate 24 as in Figure 1, the operator proceeds to drill a hole which in the form shown is assumed to be ¼ inch in diameter or other convenient size, the drill 50 being placed in the hole 11 which is assumed to be a ¼ inch hole. The hole thus drilled will be of accurate size .250 inches, as the drill revolves in the guide hole 11 in which it fits closely and cannot wobble, a result difficult or practically impossible to attain without this or similar equipment. The clamp is now released by unscrewing or screwing downwardly the nut 6, Figure 1 and the operator now proceeds to drill the hole at the point or intersection B', Figure 8 in the same manner, however, after setting the device over the intersection B', the operator presses a .250 inch diameter plug 27 in the hole already drilled at C'. The operator then measures with the micrometer caliper 28 as shown in Figure 9 or other suitable and available instrument spanning the button 10 at the cylindrical portion 19', the plug 27, and the space X. According to the figures assumed, the button 10 is .750 inch in diameter, the plug 27 is .250" in diameter and the center-to-center of the holes B' and C' is 1.750". Hence the radius of button 10 plus 1.750" plus radius of .250" (diameter plug 27), i. e., .375" plus 1.750" plus

.125"=2.250"

Using a suitable micrometer calipers, i. e., 2 inches-3 inches micrometer, the operator adjusts the button by tapping back and forth until the correct overall measurement is obtained by micrometer or other suitable instrument, then tightening the device and drilling as previously described. Otherwise precision guage blocks may be used between the button and plug, the size of block being obtained by subtracting the radii of the button and plug combined from the center-to-center distance which is 1.750".

Subsequent holes as the hole A' may be located and drilled as described, measuring from the holes previously drilled. If the remaining hole to be drilled at A', Figure 9 forms a right triangle A'—B'—C', the distance of hole A' from C' can be found by the well-known rule, i. e., the hypotenuse being equal to the square root of the sum of the squares of the sides A'—B', and B'—C'. This would be done after plugging both holes B' and C' and measuring over both plugs and button 10 for the precise location of hole A', i. e., the hole A' could be located from the hole B' and also from the hole C' in the manner described, two such measurements being necessary to locate it accurately.

The primary holes thus drilled may afterwards be enlarged by suitable counter bores, having pilots .250" in diameter, using the ordinary drill press.

Figure 15:
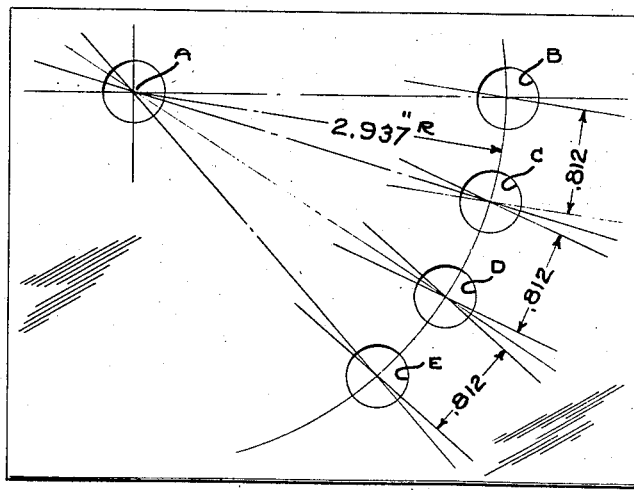
Figure 15 is a diagram illustrating a further application of the invention.

Figure 15 illustrates the manner of locating and boring holes B, C, D, E, along an arc having its center at A, the holes being spaced as indicated and the figure being drawn to one half size. This cannot be done with the prior art instruments without a full knowledge of higher mathematics; the holes in Figure 15 can be located according to the method already described in connection with Figures 7, 8, and 9.

The instrument in Figure 1 has a limit, i. e., has a limiting size or span as to the distance at which holes can be located from the margin of a plate or sheet, this limit is from the center of the button 10 to the nearest edge of screw 4. If for example the limit for the instrument shown is 4", a hole cannot be drilled ordinarily when the edge of the work or plate to be bored is more than 4" from the hole. To overcome this difficulty the present apparatus as shown in Figures 1 to 6 may be provided with extensions as illustrated in Figures 10 to 14.

Referring to Figure 1, two holes 30 and 31 may be bored in the upper bar in the end portion adjacent the button 10 and spaced in the direction of the length of the bar and two holes 32 and 33 correspondingly bored in the lower bar and similarly located, the holes extending horizontally through the bars from one vertical side to the other vertical side, at right angles to the length of the bar as thus shown in Figure 1.

Figure 14:
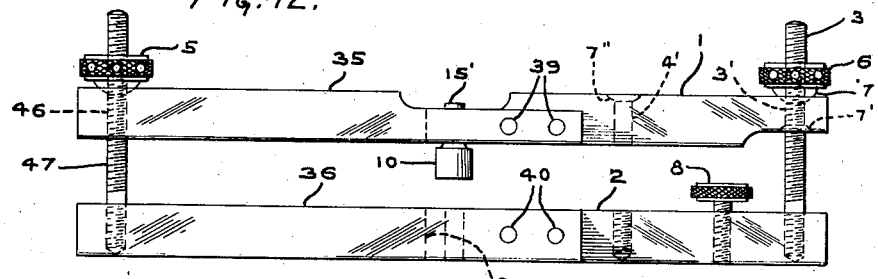
Figure 14 is an elevation of the device corresponding to Figure 1.

Referring now to Figures 10 to 14, it will be noted that by removing the middle screw 4 the span of the instrument may be increased by applying extension members 35 and 36 as in Figure 14. As shown, both bar extensions are formed with a bend 23, 23' to permit the screw 47, for which screw 4 may be used and which is seated in the outer end of the lower extension bar 36 and passed through hole 46 in the outer end of upper extension bar 35 to be aligned with the center of the button 10 and screw 3 which latter screw is located as in Figure 1. To this statement there is the exception that in this instance the nut 6 is placed above the upper bar 1. Screw 47 is engaged by a nut 5 which cooperates with the top of the bar 35 as in Figure 1. Both of the bar extensions 35 and 36 are provided with an offset portion 37, 38 beyond the bend 23 for the purpose just noted, and this offset portion carries two pins 39 and 40 in the respective extension bars adapted to enter the holes 30 to 33 in bars 1 and 2 shown in Figure 1, thus giving the instrument the appearance which it has as assembled in Figure 14 the button 10 being at the center. With the extension bars 35 and 36 applied as shown, the reach or capacity or span of the instrument is doubled. Hence, if as primarily designed, its capacity, i. e., its greatest capacity were suitable for drilling a hole in the center of a plate of 4" radius; with the extension described it can be used to drill at the center of a 16" circle, i. e., 8" radius without forfeiting or reducing the advantages previously pointed out.

The term, approximately parallel, as used in the claims is intended to define the relation of arms 1 and 2 in Figure 1 and any relation they may assume in the operation of this instrument as described, and it may also be noted that screws 3, 4 and 47 and nuts 5 and 6 are referred to as clamping means, screws 3 in Figure 1 acting as a thrust member and screw 4 as a tension member for which other suitable clamping means may be substituted and button 10 may be supported in operative contact with the work by various means and expedients other than the arms 1 and 2 and said screws.

Having thus described as an example of the application of my invention a single instrument in what is at present regarded as the preferred form, I would have it understood that a degree of modification in accord with the skill of the average mechanic is contemplated. What I claim is new and desire to secure by Letters Patent is:

1. In an instrument for locating and spacing holes to be bored with their axes normal to a surface of the work and of a predetermined precise diameter, the combination of a drill centering and aligning button having a longitudinal bore concentric with the button axis and of predetermined size whereby it is adapted to fit a drill of corresponding diameter, two approximately parallel clamping arms between which the work is to be located, the button having a universal engagement with one said arm concentric with the button axis and extending therefrom toward the second said arm, the button further having a work contacting end at right angles to said axis and disposed toward said second arm, and clamping means for forcing said arms one toward the other to clamp the work between said contacting end and said second arm with the button axis normal to said work surface, comprising two screws fixed in the second said arm, a nut on each said screw, one screw and nut intermediate the length of said arms exerting tension on said arms, and the other screw and nut between the ends of said arms remote from the button exerting a thrust on said arms, spherical seats in the first said arm for said nuts and spherical faces on said nuts contacting said seats when in clamping position, the universal connections of said clamping means cooperating with the universal engagement of said button with the first said arm allowing the normal clamping of said button to the work without bringing the arms to parallel position one with the other.

2. An instrument according to claim 1 in which the button is loosely and universally retained from falling from its seat in the first said arm.

3. In an instrument for locating and spacing holes to be bored with their axes normal to a surface of the work and of a predetermined precise diameter, the combination of a drill centering and aligning button having a longitudinal bore concentric with the button axis and of predetermined size whereby it is adapted to fit a drill of corresponding diameter, two approximately parallel clamping arms between which the work is to be located, the button having a universal engagement with one said arm concentric with the button axis and extending therefrom toward the second said arm, the button further having a work contacting end at right angles to said axis and disposed toward said second arm, and clamping means for forcing said arms one toward the other to clamp the work between said contacting end and said second arm with the button axis normal to said work surface, said clamping means comprising two screws spaced in the direction of the length of the arms and at different distances from said button and two extension members of approximately equal effective length and means for attaching said extension members respectively to corresponding ends of said respective arms whereby the length of each arm is equally increased, and means at the outer ends of said extension members for engaging one of said clamping means whereby the clamping means nearest to said button may be removed and suitable clamping means may be placed at the outer ends of said extensions increasing the maximum spacing from the edge of the work of the holes which may be located by the instrument.

SAMUEL R. BOYER.